July 26, 1955 A. R. STAHL 2,713,878
FORMING AND CUTTING MACHINE FOR RADIO COMPONENTS
Filed Jan. 5, 1952 3 Sheets-Sheet 1
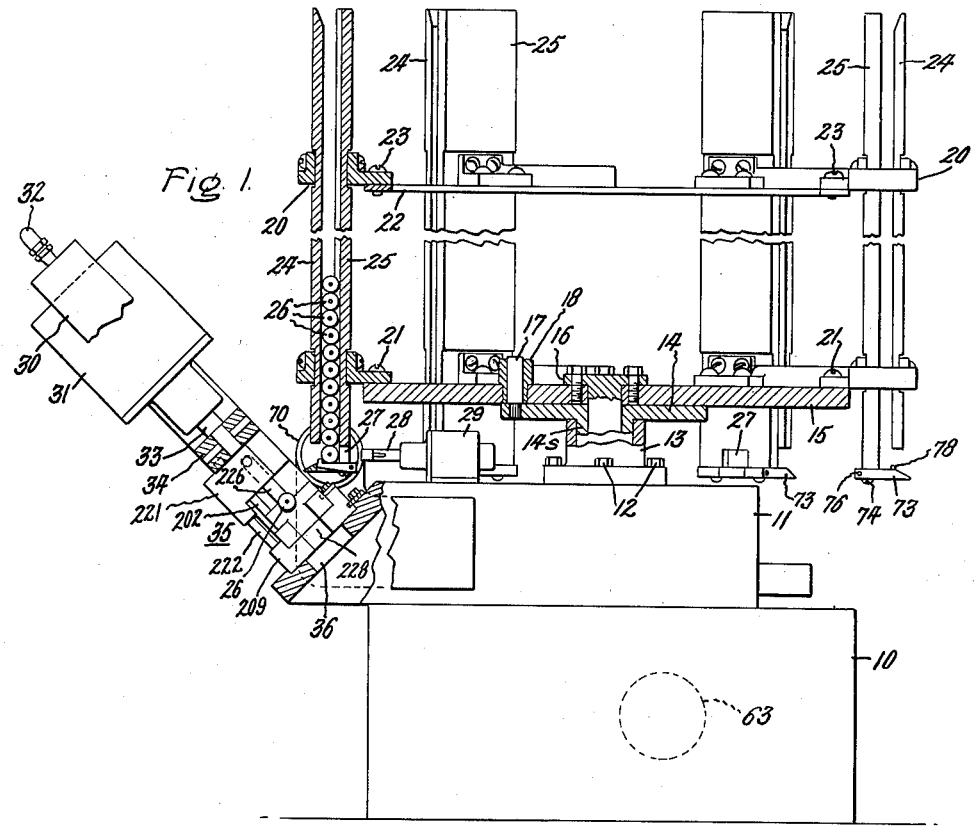
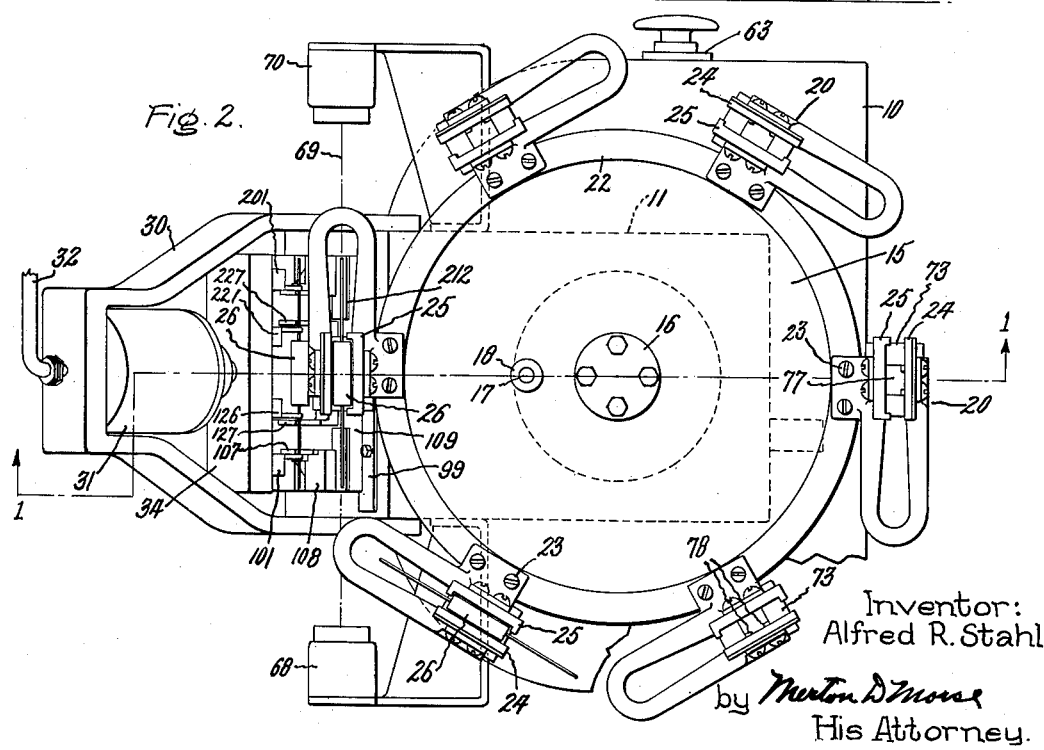
Inventor:
Alfred R. Stahl
by Morton D. Morse
His Attorney.

July 26, 1955 A. R. STAHL 2,713,878
FORMING AND CUTTING MACHINE FOR RADIO COMPONENTS
Filed Jan. 5, 1952 3 Sheets-Sheet 2
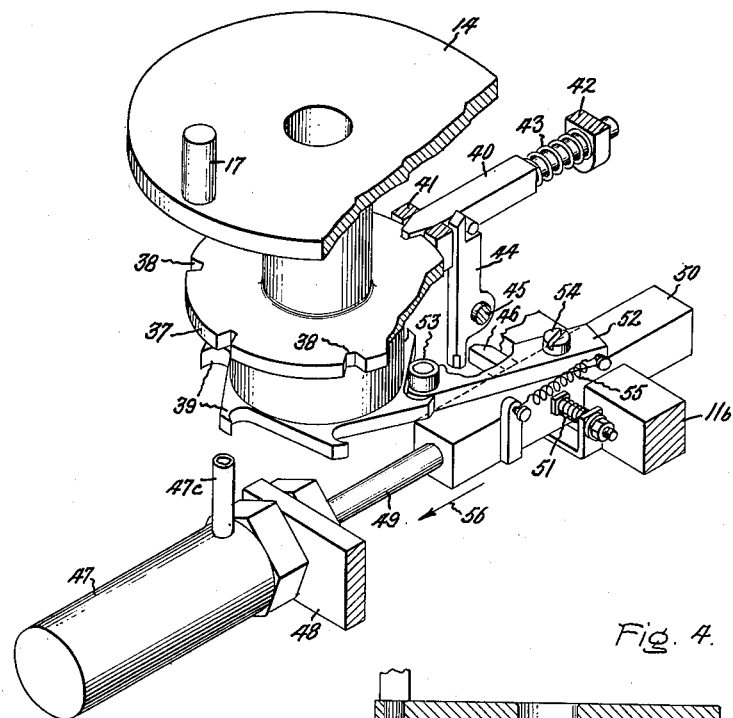
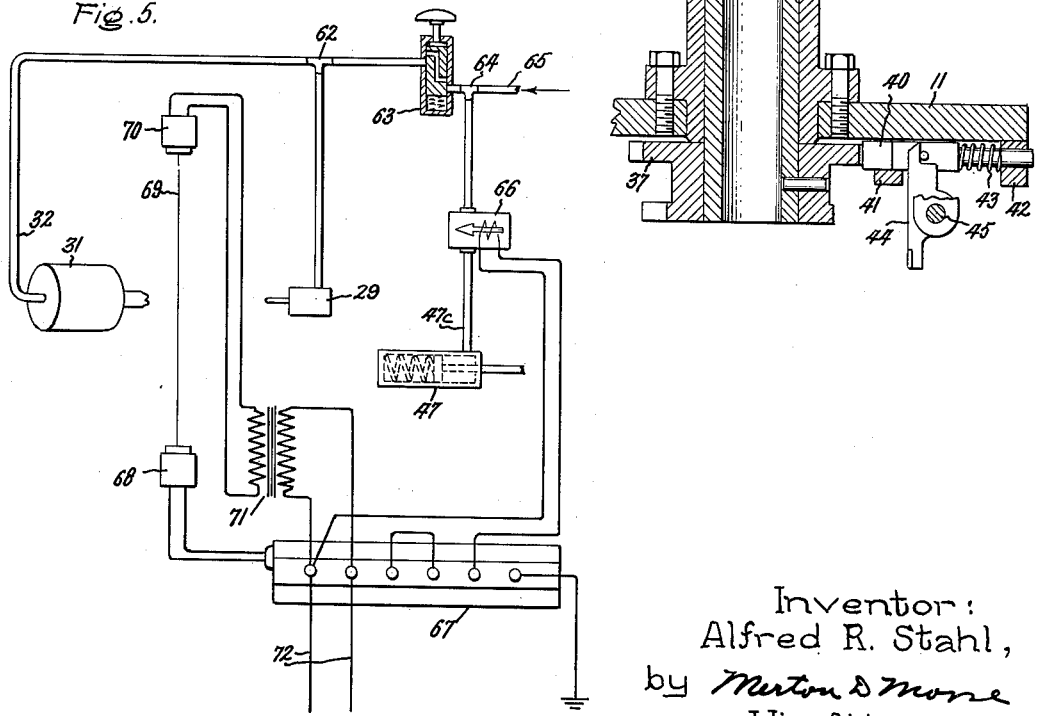
Inventor:
Alfred R. Stahl,
by Merton D. Moore
His Attorney.

July 26, 1955                    A. R. STAHL                    2,713,878
               FORMING AND CUTTING MACHINE FOR RADIO COMPONENTS
Filed Jan. 5, 1952                                    3 Sheets-Sheet 3
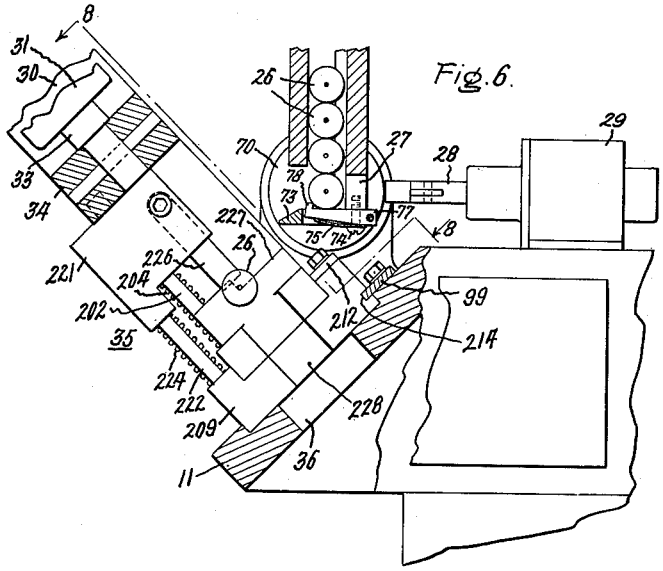
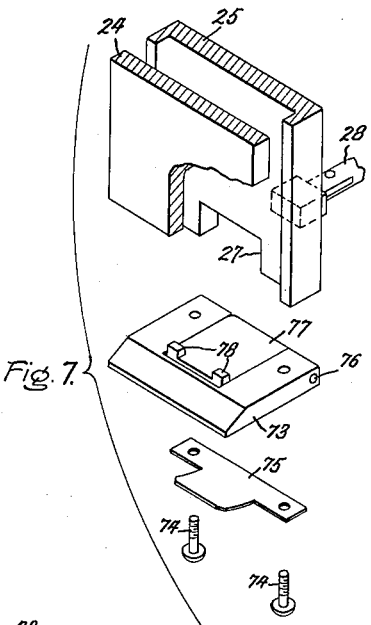
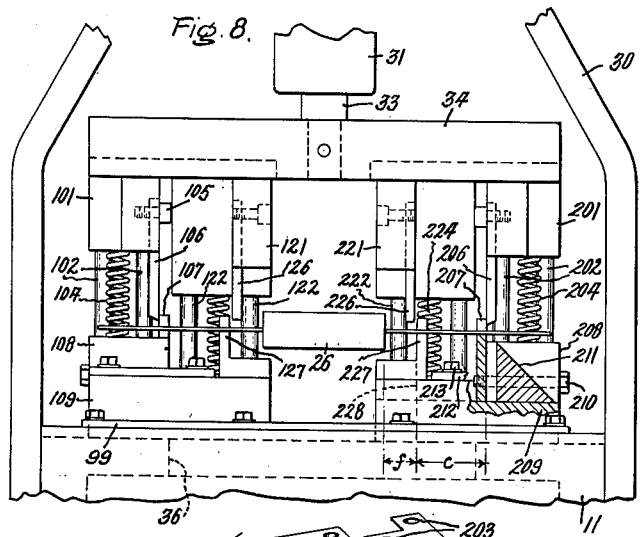
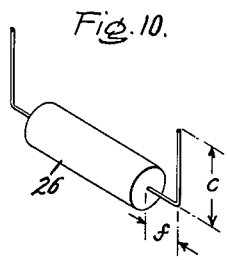
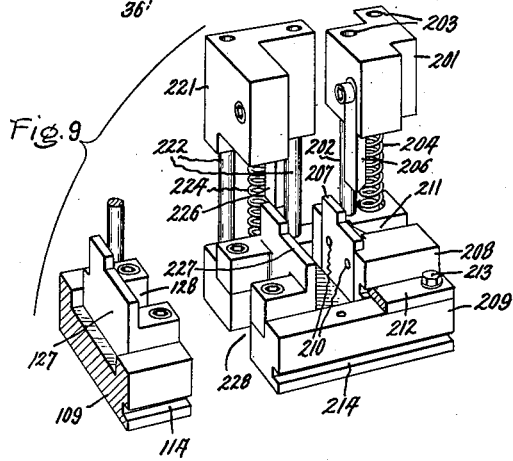
Inventor:
Alfred R. Stahl,
by Merton D. Moore
His Attorney.

United States Patent Office 2,713,878
Patented July 26, 1955

2,713,878

FORMING AND CUTTING MACHINE FOR RADIO COMPONENTS

Alfred R. Stahl, Garnet Lake, N. Y., assignor to General Electric Company, a corporation of New York Application January 5, 1952, Serial No. 265,156

3 Claims. (Cl. 140—71)

My invention relates to a forming and cutting machine useful, for example, in the manufacture of components for electronic assemblies.

In the highly competitive field concerned with the manufacture of a multitude of small parts such as capacitors and resistors of variant size, it is desirable to have a machine capable of performing one or more steps of component manufacture on a multitude of components of one particular size, with the machine quickly adjustable to render it capable of performing the same or similar operations on a different multitude of components of a different size. In machines of the general type hereafter described it has heretofore been found difficult, if not impossible, to combine desirable features of automatic turret feed, indexing control and adjustable dies to accommodate partially finished electronic equipment components of variant size.

It is an object of the present invention to provide simple and inexpensive means for overcoming the above-mentioned difficulty.

A further object of the present invention is to provide an automatic lead forming and trimming machine useful in the manufacture of electronic equipment components and satisfactorily combining features of adjustable forming and cutting dies, turret feed, and photoelectric indexing control.

In accordance with one aspect of the present invention I provide a lead forming and cutting machine having a magazine turret suitable for electronic components having variant length leads which are to be processed. The machine has a plurality of die assemblies each of which has sliding self-contained cutting and forming die units which can be adjusted to cut off and form any desired portions of the respective component leads. Photoelectric means are provided for indexing the magazine turret in such a way that at all times a loaded magazine (if there is any) is located over the dies so that all components in the magazine turret may be processed without stopping. It is also possible to reload any magazine during the cycle of cutting and forming by sliding the components into the respective magazines.

Other objects and advantages will become apparent and my invention will be better understood from consideration of the following description taken in connection with the accompanying drawing in which Fig. 1 is a side elevational view, partly in section, of a forming and cutting machine constructed in accordance with the invention; Fig. 2 is a plan view of the machine shown in Fig. 1; Fig. 3 is a cut-away and enlarged view showing the index and lock mechanism for the machine of Figs. 1 and 2; Fig. 4 is a sectional view taken through the middle of the support and index wheel of Fig. 3; Fig. 5 is a schematic representation showing wiring and piping for the machine of Figs. 1 and 2; Fig. 6 is an enlarged cut-away portional elevation showing the component feeding portion of the machine; Fig. 7 is an exploded view showing the trip lever assembly used at the bottom of each of the magazines shown in Figs. 1, 2 and 6; Fig. 8 is an elevational view of the die assembly taken on line 8—8 of Fig. 6; Fig. 9 is a perspective view of a portion of the assembly shown in Fig. 8; and Fig. 10 is a pictorial representation of a completed one of the components which the machine of the invention is designed to process.

Referring now to Fig. 1, 10 represents a box-like base on which there is secured an upper box-like structure 11 which contains parts of an index and lock mechanism hereinafter more fully described. Secured to the top of structure 11 as by a plurality of bolts 12 is a bronze bushing 13 which acts as a journal bearing for a shank portion 14s of a magazine support 14 rotatably mounted within and upon the bushing 13. Support 14 in turn supports a magazine base plate 15 which is the base of a magazine turret assembly hereinafter to be described. I have shown means provided for centering base plate 15 upon support 14, and in the illustrated embodiment such means takes the form of a top cap 16 bolted to base plate 15 and having a shank portion passing through a center hole in support 14.

Since a principal function of the machine described is to process variant sized resistors, capacitors or other components, I provide means for quickly removing any one turret magazine assembly to replace it by another designed for different sized components. To this end magazine base plate 15 is merely laid upon support 14. A pin 17 is secured to support 14 and designed to mate with a bushing 18 secured to turret base 15 so that the turret magazine will be driven from support 14.

Each magazine turret assembly (of which only one is shown) comprises six circumferentially spaced slide brackets 20 secured to the respective magazine base plate 15 as by screws 21. Six more slide brackets 20 are fastened to an upper magazine ring support 22 as by screws 23, and, as seen from Figs. 1 and 2, upper and lower brackets are circumferentially aligned in pairs with each pair holding a pair of front and back slides, 24 and 25, respectively, with each pair of slides forming a rack or magazine provided for holding a stack of components 26 which are to have their leads formed and trimmed. As shown in Fig. 2, the front slides are flat whereas the back slides have turned-in ends for holding the components against axial movement. It is to be understood that usually components, such as resistors or capacitors, are initially placed in stacks between front and back plates 24 and 25 in all of the various magazines although components 26 are shown in only two magazines in Fig. 2.

For ejecting components 26 from the magazines, each magazine inner slide 25 is provided with an aperture 27 (Fig. 1) through which, whenever an individual magazine is rotatably aligned at a single discharge position as hereinafter explained, a plunger 28 is adapted to extend to discharge the lowermost component. Plunger 28 is operated by a piston responsive to fluid pressure in a "knockout" cylinder 29 as more fully explained in connection with other figures of the drawing.

A bifurcated support member 30 is fastened to the box-like structure 11 at one end thereof and holds an air press cylinder 31. Cylinder 31 is fed with fluid pressure as by a conduit 32 to move a piston rod 33 connected to a press block 34. Block 34 operates in conjunction with the cutoff and forming die assembly indicated generally at 35 in Fig. 1 and more fully described in connection with the descriptions of Figs. 6–8. The dies serve to trim and form the leads at the end of each individual component 26 as it is ejected from the respectively aligned magazine into the die assembly and subsequently discharged through an aperture 36 (Fig. 1) into the box 11 or into a hopper therebelow (not shown) from which the completed components may be removed from time to time.

Box 11 also serves to hold the major portion of the index and lock mechanism assembly which, as shown in Fig. 3, comprises the magazine support wheel 14 which is formed integral with or secured to an indexing wheel having a peripheral portion 37 provided with locking notches 38. The indexing wheel also has ratchet teeth 39. The locking notches 38 are enagageable by a lock pin 40 which is slidable in stationary bearing blocks 41 and 42. Pin 40 is biased inward toward any one of the notches 38 by a compression spring 43, and is withdrawn from the notches by rotation of a trip lever 44 such that the trip lever urges the locking pin outward against the compressive force of spring 43. Trip lever 44 operates around a fulcrum provided by a stationary pin 45 and operates responsive to movement imparted by either the spring 43 (causing trip lever 44 to rotate in one direction), or a trip pin 46 (causing trip lever 44 to rotate in the opposite direction).

The assembly is operated by the introduction of fluid pressure to an indexing air cylinder 47 secured to a stationary bracket 48 (which may be assumed affixed to the box-like structure 11 of Fig. 1). The piston in cylinder 47 may be spring biased to the right and fluid pressure introduced through a conduit 47c (Fig. 3) to cause it to move to the left pulling piston rod 49 and an attached indexing slide 50 also to the left. Slide 50 may be supported for slidable engagement through an end wall or base member 11b of the structure 11 of Fig. 1.

As indicated in Fig. 3, the trip lever 46 is slidably mounted through an opening in indexing slide 50 and is urged in one direction by a compression spring 51 and there is a flat face of lever 46 presented to trip lever 44 for one direction of travel, and an inclined face of lever 46 presented to trip lever 44 for the opposite direction of travel so that when slide 50 moves to the left, levers 46 and 44 will act to withdraw pin 40 from the associated locking notch 38, and when slide 50 moves to the right (for reset) lever 46 will merely withdraw (against the force of spring 51) and not attempt to operate locking pin 40 for this direction of travel of the indexing slide.

Indexing slide 50 carries an indexing ratchet arm 52 which terminates in a roller 53 designed to mate with any one of the ratchet teeth 39. To achieve this mating, arm 52 is pivotably mounted on the slide 50 by a screw 54, with the arm biased for one direction of rotation by a tension spring 55.

In operation, when fluid pressure is introduced through conduit 47c to cylinder 47, the direction of movement of indexing slide 50 will be leftward in the direction of arrow 56. This will rotate trip lever 44 to withdraw locking pin 40 from the corresponding notch 38 and simultaneously cause roller 53 to move a mating ratchet tooth 39 until the end of the stroke. Then when the fluid pressure is released, the spring in cylinder 47 will cause movement of slide 50 in the opposite direction to reset the ratchet mechanism at the next ratchet tooth at which point the index wheel is held by reengagement of locking pin 40 with a new notch 38.

It is assumed that each of the six positions at which locking pin 40 is engaged with a notch 38 and at which the ratchet arm roller 53 is engaged in a groove at one side of a ratchet tooth 39, corresponds to one of the six positions at which one of the magazines is aligned with the air press and with the die assembly, and at which a back slide aperture 27 is aligned with plunger 28.

Referring now to Fig. 5 which is a wiring and piping schematic diagram of the apparatus shown in the other figures of the drawing, the air press cylinder 31 is fed by conduit 32 through a T-fitting 62 from an operator's control valve 63, which in turn is fed through a T-fitting 64 from a fluid pressure supply conduit 65. For illustration it may be assumed that the fluid under pressure is compressed air. The indexing air cylinder 47, the knock-out cylinder 29 and the press cylinder 31 are all fed from the same air supply, but it will be observed that the operator's control valve controls only knock-out cylinder 29 and press cylinder 31 (connected to the T 62), but does not control the indexing air cylinder 47 which has its feed conduit 47c connected to a solenoid operated air valve 66 which, in turn, is supplied from the T 64. Solenoid control valve 66 is energized from a photocell control unit 67 responsive to illumination of a photocell 68 from a light beam 69 coming from a light source 70. Light source 70 comprises a bulb which is energized through a transformer 71 from power supply lines 72 which also provide power for the photocell control unit 67.

Referring back to Figs. 1 and 2, it will be observed that light beam 69 will be interrupted whenever the aligned magazine contains any components (because one of them will drop to the bottom of the magazine), but as soon as the particular magazine is empty the beam will energize the photocell to turn the turret assembly through operation of the index and locking mechanism and, if there is one, bring a loaded magazine into alignment with the press, the dies and the knockout cylinder.

In Fig. 6 I have shown an enlarged side view of the knockout mechanism and of a portion of the air press and of cut-off and forming mechanism hereafter more fully described in connection with Figs. 8 and 9. The cutting and forming mechanism is claimed in my co-pending divisional application, Serial No. 316,283, filed October 22, 1952.

In Fig. 7 I have shown an exploded view of the parts making up the trip lever assembly used at the bottom of each magazine as seen in Figs. 1, 2 and 6. As will be most clearly seen from Figs. 6 and 7, the bottom of each magazine chamber just below the aperture 27 is provided with a stationary bottom plate 73 secured to the inner slide 25 by a plurality of screws 74 which also pass through a bottom spring member 75. Secured to the bottom plate 73 by a pin 76 is a trip lever or dog 77 provided with upstanding lugs 78 and which is biased upward by spring 75 but rotatable against the pressure thereof around the pin 76 to allow any individual component 26 to be ejected from the magazine whenever it is urged outward by the plunger 28 causing the component to depress the retaining lugs 78 against the pressure of spring 75. Each front (i. e., outer) slide 24 clears the associated base 73 by an amount sufficient to allow an individual component to slide or roll therebetween and into the punch and die assembly which may be understood from reference to Fig. 8 which is an elevational view along the line 8—8 of Fig. 6.

In Fig. 8 the block 34 is shown holding what may be referred to as a left hand cut-off punch holder 101 slidable to left and right in block 34 and slidable up and down on relatively stationary dowels 102 engaging slide holes in the punch holder and with a compression spring 104 biasing the holder upwards unless an overcoming force is exerted by the air press operating block 34. Punch holder 101 has secured therein, by a screw 105, a left hand cut-off punch 106 designed to cooperate with a left hand cut-off die 107 which is stationary with respect to a left hand cut-off slide 108 in which the dowels 102 are fixed. Slide 108 is slidably mounted for left and right movement along a left hand slide base 109 so that the cut-off point may be changed as is necessary, from time to time, since in the process of making electronic components, such as resistors, different lead lengths are required to accommodate varying assembly conditions in the equipment in which the components are to be installed.

Block 34 also holds a right hand cut-off punch holder 201 sliding on dowels 202, biased upward by a spring 204, and having secured therein a punch 206 which cooperates with a right hand cut-off die 207 held in a right hand cut-off slide 208 as by a plurality of screws 210. Slide 208 is adjustably held on right hand slide base 209 and the construction may be more clearly understood from reference to Fig. 9 which is a perspective view showing a portion of the left hand die assembly and all of the right hand punch and die assembly. From Fig. 9 it is seen that holes such as 203 are provided for accommodating the dowels (202) in sliding engagement with the punch holder (201. As also apparent from Fig. 9, each cut-off slide (such as 208) is provided with a central chute (211) for facilitating discharge of unwanted clipped lead ends. Means are provided for adjustably securing each slide (108, 208) on the associated slide base (109 or 209) and in the illustrated embodiment such means comprise longitudinal grooves in the slides engaged by clamps (such as 212) secured to each respective slide base by screws (such as 213). Similarly the slide bases (109, 209) are provided with grooves (114, 214) each engageable by a removable clamping rod 99 serving to adjustably secure them to a portion of structure 11 adjacent the opening 36.

For the purpose of enabling these sliding adjustments, the punch holders 101 and 201 are slidable along block 34 and this is also true of left and right hand forming punch holders, 121 and 221, respectively, each of which slides up and down on dowels (122, 222), and is biased upward against block 34 by a compression spring (124, 224), and holds a forming punch (126, 226) arranged to cooperate with a forming die (127, 227), the forming dies being solidly secured one on each of the respective left and right slide bases 109 and 209.

Since the slide bases (109, 209) are slidable on structure 11 and carry the dowels (122, 222) supporting the forming punch holders (121, 221), while the cut-off slides (108, 208) are separately slidable on the slide bases (109, 209) and separately carry the other dowels (102, 202) holding the cut-off punch holders (101, 201), it will be apparent that left hand forming length, right hand forming length, left hand cut-off length, and right hand cut-off length are all independently adjustable, to accommodate varying assembly conditions in equipment in which the components are to be used and requiring variant multiplicities of form lengths and lead lengths.

It will be observed from the drawings that when any component is ejected from a magazine into the die assembly it is supported in the latter entirely by its uncut and unformed leads. The forming dies and slide bases are provided with open spaces (128 and 228 in Fig. 9) which, as soon as the leads are cut and formed, permit the component to drop down and out of the die assembly and through the aperture 36 in the base structure 11.

Fig. 10 is a perspective view of a finished component 26 in which the right hand formed length is designated as "f" corresponding to a distance "f" between the end of the component and the side of the forming die 227 adjacent forming punch 226 in Fig. 8, and "c" (in Fig. 9) is a right hand cut-off length corresponding to the distance between forming and cut-off points as indicated at "c" in Fig. 8. It is apparent that these lengths and the corresponding left hand lengths are independently adjustable so that the machine meets the requirement of being capable of being adjusted according to assembly requirements by having the cutting and forming operations done in separate self-contained units arranged on bases which permit movement of each unit independently of the others.

In operation the components are stored vertically and slide down a rack and are pushed out of the bottom of the rack into the die assembly, the capacity of the machine being increased because of the provision of a turret assembly comprising a plurality of racks or magazines. Whenever the last part is pushed out of one magazine, the light beam passes through the open space and by means of the photocell energizes the ratchet drive mechanism to turn the next loaded magazine into the operating position, so that the feeding of the components into the die assembly is done by a magazine turret, to allow long uninterrupted operation, with the turret automatically indexed in such a way that at all times a full magazine (if there is any) will be located over the dies.

Whenever a full, or partially full, stack of components is indexed adjacent the dies, the operator's control valve can be operated to cause plunger 28 to push one component out of the rack at the same time that the large piston in cylinder 31 operates the forming and cutting dies on a previously discharged component. As soon as the supply of components in one stack is exhausted, the photocell control indexes the turret to bring the next full or partially full magazine into position. Because the indexing is automatic, it is only necessary for the operator to feel that he is manually operating the die part of the machine because the mechanism will then automatically feed all of the parts in the magazine turret without stopping. Of course, if desired, the die operating control could also be operated automatically at any desired time cycle rather than by hand. Utilization of the photocell control means that the number of components placed in each magazine rack need not be counted because the machine will automatically turn to a new magazine each time that an individual magazine has discharged all of its load.

As already explained, magazine turrets may be exchanged to accommodate different size components to be handled and the die assembly has sliding self-contained cutting and forming die units which can be adjusted to cut off and form desired portions of component leads, since, within limits, the various forming and cutting dies are individually adjustable by virtue of their slidable mounting on different base blocks.

There is thus provided a device of the character described able to cut and form component leads to such a design and length as is necessary for assembly in electronic equipment.

While I have illustrated and described a particular embodiment of my invention, modifications will occur to those skilled in the art. I desire it to be understood, therefore, that my invention is not to be limited to the particular arrangement disclosed and I intend in the appended claims to cover all modifications which do not depart from the true spirit and scope of my invention.

What I claim as new and desire to secure by Letters Patent of the United States is:

1. In a forming and cutting machine for the manufacture of electronic equipment components, the combination of a magazine turret comprising a plurality of vertical slide racks arranged to hold components of like size in circumferentially spaced vertical stacks, a rotatable support for said magazine turret and for holding the same for rotation therewith, said magazine turret being loosely placed on said rotatable support for ready replacement by a turret adapted to hold components of a different size, a stationary base member arranged to hold said rotatable support and having an index and lock mechanism arranged to cooperate therewith to sequentially bring each of said racks into alignment at a single discharge position, component discharge means carried by said stationary base member and having a plunger adapted to discharge the lowermost component from any aligned rack at said single discharge position, adjustable dies adapted to receive any component so discharged at said discharge position, press means for causing said dies to process a component so discharged therein, automatic control means for operating said index and lock mechanism responsive to the absence of components in the rack aligned with said single discharge position, and supervisory control means for operating said component discharge means and said press means for causing said dies to process the discharged component.

2. A machine for processing electronic assembly components comprising a box like base structure having a bushing member extending vertically above said structure, a rotatable support member mounted on said bushing member and having a shank portion rotatable within said bushing and terminating therebelow in an index wheel having a plurality of locking notches and a like numbered plurality of ratchet teeth, a turret magazine comprising a base plate removably secured for rotation upon said rotatable support member and comprising a plurality of circumferentially spaced vertically extending component storing magazines secured to said base plate, said last mentioned plurality being like in number to the number of locking notches and of ratchet teeth, said box like base structure having contained therein an index and lock mechanism comprising a locking pin adapted to sequentially engage each of said locking notches, spring means arranged to bias said locking pin into any of said notches when aligned therewith, a trip lever arranged to disengage said pin from said notches against the force of said spring means, an indexing slide adapted to operate said trip lever for a single first direction of movement of said slide, an indexing fluid pressure cylinder for causing movement of said slide in said first and in an opposite second or return direction, an indexing ratchet arm carried by said slide and having a portion designed to mate with any one of said ratchet teeth for causing rotation of said indexing wheel and said rotatable support member and said turret magazine with movement of said slide in said first direction, means for rendering said ratchet arm inoperative to cause movement of said ratchet wheel with movement of said slide in said second direction, fluid pressure supply means for supplying fluid pressure to said indexing cylinder, a solenoid operated valve interposed between said supply means and said cylinder, photoelectric responsive control means arranged to alternately energize and de-energize said solenoid operated valve, a photocell arranged to energize said control unit responsive to a light beam, a light source arranged to energize said photocell with a light beam passing through any empty magazine aligned therebetween, and power supply means for energizing said light supply source and said control unit.

3. In a machine for trimming and forming the leads at each end of each of a plurality of electronic components, the combination of a box-like base structure having a bushing member extending vertically above said structure, a punch and die assembly supported by said base structure, a rotatable support wheel mounted on said bushing member and having a shank portion rotating within said bushing and terminating therebelow in an index wheel having a plurality of "$n$" circumferentially spaced locking notches and a plurality of "$n$" circumferentially spaced ratchet teeth, a turret magazine supported on said support wheel for rotation therewith and comprising "$n$" vertically extending slide racks each adapted to hold a stack of said components, an index and lock mechanism contained in said box-like structure and comprising a locking pin arranged to mate with a different one of said notches in "$n$" different aligning positions, said mechanism also comprising an indexing ratchet arm arranged to engage a different one of said ratchet teeth in each of said "$n$" positions and to move said ratchet wheel, said support wheel and said magazine turret from one of said "$n$" positions to the next when said locking pin is disengaged from the corresponding locking notch, first fluid pressure responsive means supported by said box-like structure and arranged to disengage said locking pin from any locking notch and to actuate said indexing ratchet arm, second fluid pressure responsive means supported by said box-like structure and arranged to discharge any component at the bottom of any magazine stack rotatably aligned therewith by said index and lock mechanism, third fluid pressure responsive means supported by said box-like structure and arranged to operate said punch and die assembly to form and trim the leads of any component so discharged from an aligned magazine stack, said punch and die assembly comprising sliding self-contained forming and cutting punch and die units adapted to be adjusted to cut off and form any desired portion of the leads at each end of each such component, fluid pressure supply means, supervisory control means interposed between said fluid pressure supply means and said second and third fluid pressure responsive means for respectively discharging said components and processing the leads thereof, and automatic control means interposed between said fluid pressure supply means and said first fluid pressure responsive means for automatically indexing and locking said turret to bring up successive stacks of components to have their leads trimmed and formed.

References Cited in the file of this patent

UNITED STATES PATENTS

| | | |
|---|---|---|
| 878,573 | Akerly | Feb. 11, 1908 |
| 1,339,443 | Evans | May 11, 1920 |
| 1,426,165 | Evans | Aug. 15, 1922 |
| 2,337,696 | Van Nest | Dec. 28, 1943 |
| 2,577,203 | Mariotte | Dec. 4, 1951 |

FOREIGN PATENTS

| | | |
|---|---|---|
| 492,572 | Great Britain | Sept. 22, 1938 |